G. H. SCHKOMMODAU.
ELECTRIC WELDING MACHINE.
APPLICATION FILED FEB. 24, 1917.

1,290,367.

Patented Jan. 7, 1919.
3 SHEETS—SHEET 3.

Inventor
Gustave H. Schkommodau
By his Attorneys
Edwards, Sager & Richmond.

UNITED STATES PATENT OFFICE.

GUSTAVE H. SCHKOMMODAU, OF CINCINNATI, OHIO, ASSIGNOR TO THOMSON ELECTRIC WELDING COMPANY, A CORPORATION OF MASSACHUSETTS.

ELECTRIC WELDING-MACHINE.

1,290,367.   Specification of Letters Patent.   Patented Jan. 7, 1919.

Application filed February 24, 1917. Serial No. 150,648.

*To all whom it may concern:*

Be it known that I, GUSTAVE H. SCHKOMMODAU, a citizen of the United States, residing at Cincinnati, in the county of Hamilton and State of Ohio, have invented certain new and useful Improvements in Electric Welding-Machines, of which the following is a specification.

This invention relates to electric welding machines and particularly to such machines of the butt welding type.

In these machines parts of an article to be joined together are gripped in relatively movable clamping heads and are pressed together lengthwise to form the weld, an electric current traversing the joint to soften the metal. With many articles, such for instance as twist drills, the parts must not only be concentric at the weld but must be in a straight line with each other so that they have a common axis throughout. With such work the ends to be joined must be brought into accurate register and the longitudinal axes of the parts must at the same time be in the same straight line, requiring a universal relative adjustment of the clamping heads to insure perfect alinement of the parts.

The object of the invention is to enable the sections of the work to be readily welded in perfect alinement with each other so that the completed article will be free from distortion. By this invention the parts of the article are supported for relative sliding and tipping movement in any desired direction to aline their axes with great precision. They are also firmly held in alinement and secured against shifting during the welding operation, so that the completed weld joins the parts in proper relation to each other. This makes unnecessary the troublesome and expensive reshaping required to true up parts welded out of exact alinement.

In the accompanying drawings.

Figure 1:
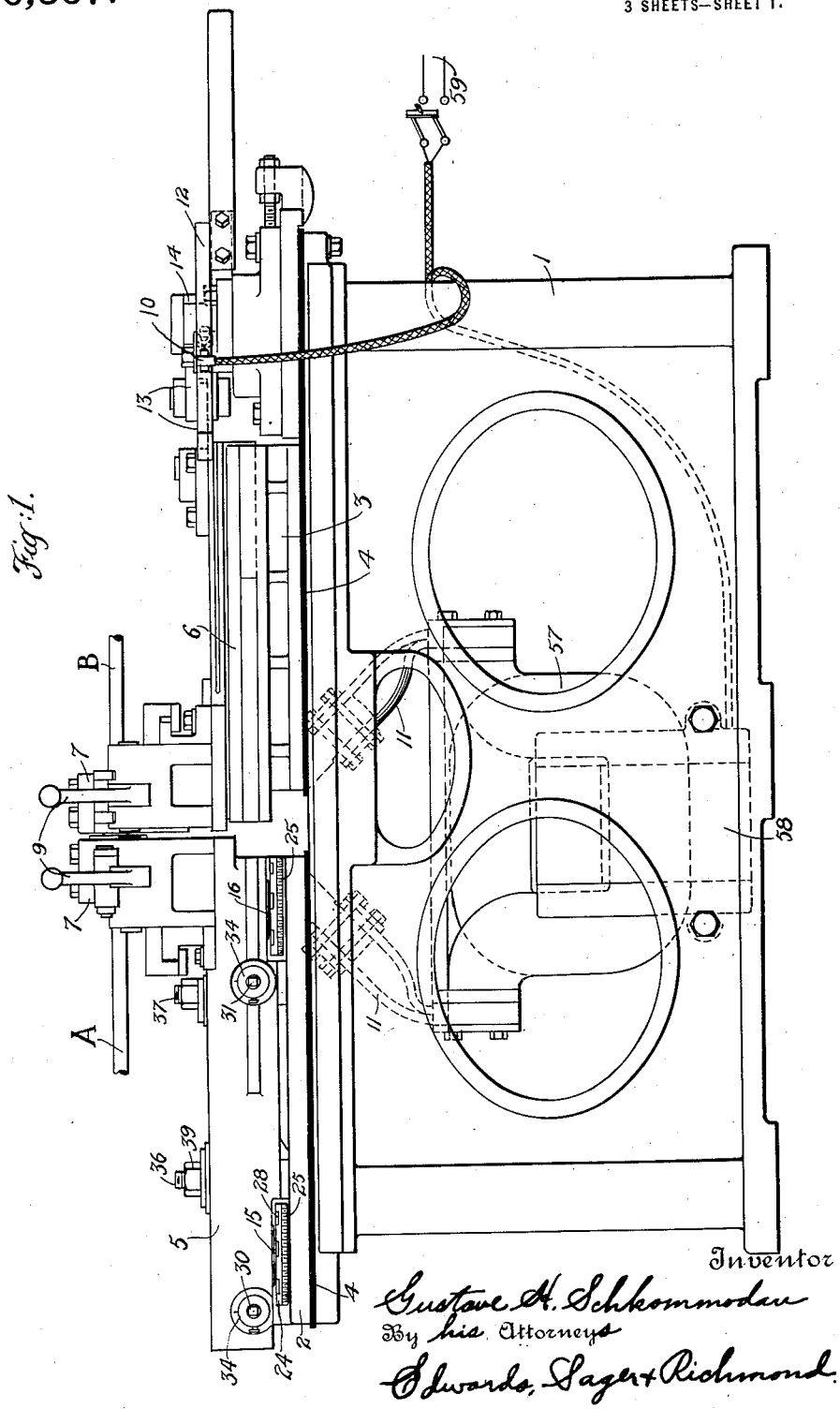
Figure 1 is a front elevation of a welding machine embodying this invention.

In the drawings, one specific embodiment of the invention is illustrated as applied to an electric welding machine having a base 1 on which are mounted the top base plates 2 and 3 insulated from the base as shown at 4 and separated from each other. Base plates 2 and 3 carry respectively a stationary adjustable head 5 supporting one part A of the work to be joined and a sliding head 6 supporting the other part B of the work (see Fig. 1). These heads are separated and are insulated from each other by the insulation 4 of their base plates 2 and 3. Each head has a sliding gripping jaw 7 and an adjustable gripping jaw 8 coöperating to clamp one part of the work between them on movement of a lever 9 acting through connections as in a quick acting eccentric vise, to force the sliding jaw 7 backward toward the adjustable jaw 8 (see Fig. 2). Adjustable backing up stops (not shown) may be provided to receive the end thrust on the sections of the article when they are pressed together.

The parts of the work are so positioned that their adjacent ends are in contact while the supporting heads are separated. The contacting ends of the work and the high resistance of the joint causes the generation of heat raising the temperature of the ends of the stock. The current of low voltage and high amperage is developed by a secondary winding 57 of a transformer mounted in the base 1 and having its primary winding 58 connected to an outside circuit 59 through switch 10 (see Fig. 1). The current is led from the secondary to the parts of the article through flexible connections 11 and conductors carried by the heads. When a welding temperature is reached the ends of the stock are pressed together to form the weld. This is done by swinging the compression lever 12 to the left to expand toggle links 13 between adjustable stationary bracket 14 and the sliding head 6 moving the sliding head to the left toward the stationary head 5 (see Figs. 1 and 2). The current is then turned off, the weld is allowed to harden somewhat and the joined parts are removed.

Figure 2:
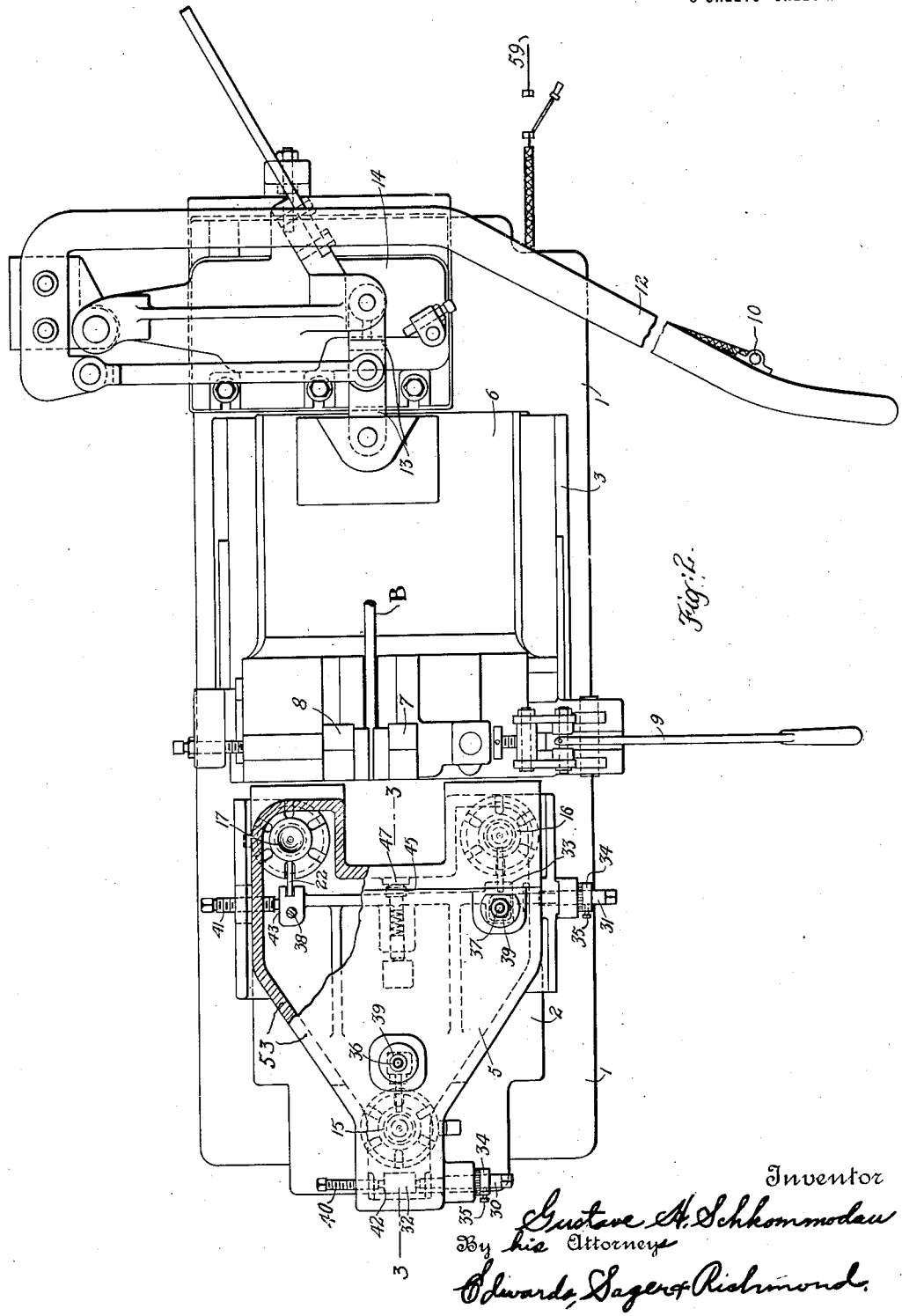
Fig. 2 is a plan view of the same with parts removed and portions broken away to show the construction beneath.
Figure 3:
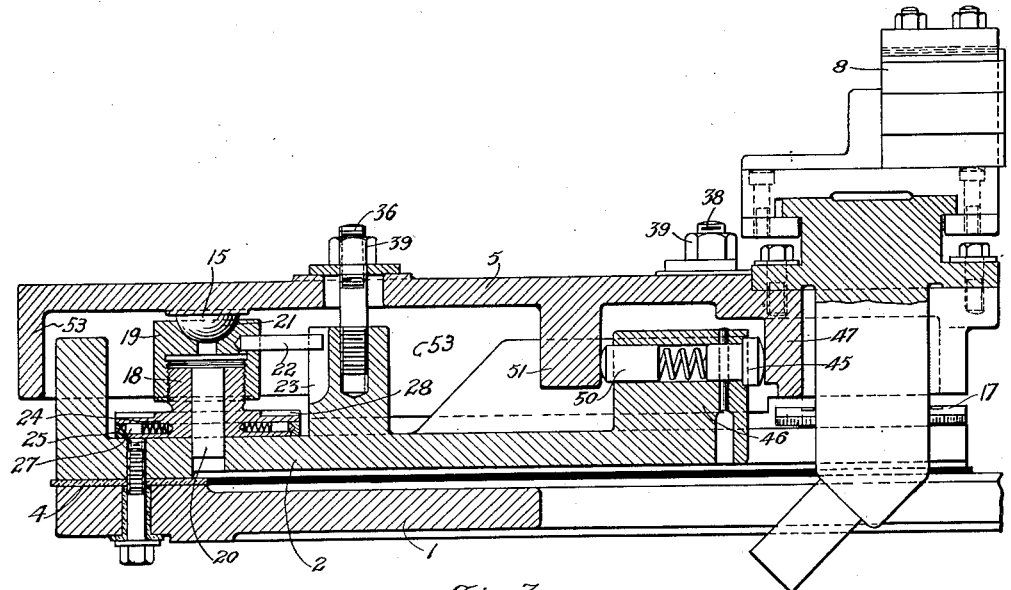
Fig. 3 is a vertical section view of the adjustable clamping head taken on line 3—3 of Fig. 2.

To bring the parts of the work in the clamping heads into perfect alinement and maintain them there, the sliding head 6 is accurately guided and confined in its movement and the stationary head 5 is provided with adjusting and clamping means. The head 5 is sustained by the base plate 2, being supported thereon by three self alining bearings 15, 16 and 17. In Fig. 2 the head 5 has its clamping jaws removed and is partly broken away to show bearing 17 beneath it. Bearing 15 is positioned near the left end of the head and bearings 16, and 17 at the right end just under the gripping jaws holding the work. Each of these bearings comprises a lower rotary sleeve 18 having a central stud 20 and screw threaded into an upper non-rotatable cup 19 (see Fig. 3). In a recess on top of each cup 19 is a self alining bearing formed by a hemisphere 21 with its flat side engaging the under surface of head 5 and its spherical surface in the cup. Each of the supports 15, 16 and 17 is separately adjustable by the screw connection between sleeve 18 and cup 19, and the hemispheres 21 accommodate themselves automatically to any position the head 5 may take. Cups 19 are held against rotation by their arms 22 sliding in slots 23 in brackets of the base plate.

Figure 4:
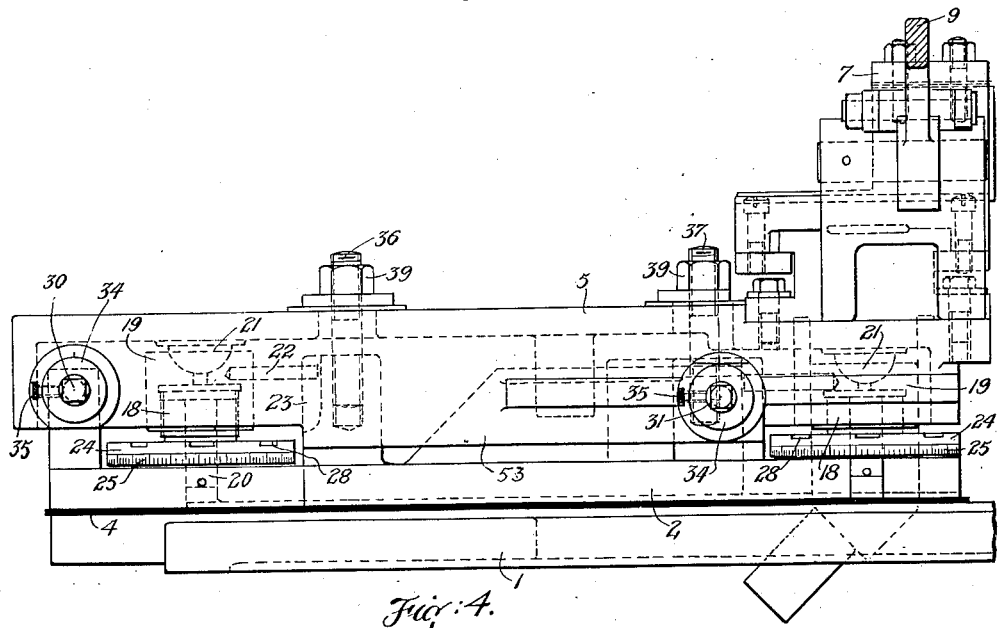
Fig. 4 is a front elevation of the adjustable clamping head.

With work of the class for which this invention is particularly adapted, alinement of the parts within very narrow limits is desirable. All adjusting means are therefore constructed for very accurate regulation and each is provided with micrometer measuring means determining the movement of the head to a very small fraction of an inch. By this means the operator does not have to make repeated approximations but may directly read and predetermine the setting of each part of the adjusting means with great accuracy. Each sleeve 18 is provided with a bottom disk 24 carrying the annular micrometer ring 25 calibrated to indicate movement of the corresponding support to a thousandth of an inch with relation to a zero line on the base plate 1 (see Fig. 4). Each ring 25 is retained in place on its disk 24 by small friction plungers 27 and when the sleeve 18 is turned, as by a wrench fitting in slots 28 in the disk, the calibrated ring 25 moves with it.

By these means any desired vertical adjustment of the head 5 may be made with great precision by raising or lowering one or more of the three supports 15, 16 and 17. Any of these three bearings can be raised or lowered independently of the others, or, if all three are moved the same number of divisions on the scale, the head 5 is moved either up or down without disturbing the alinement of the axes of the two pieces of work clamped in the jaws as far as their being parallel is concerned.

The head 5 is adjusted in a horizontal plane by means of screws 30 and 31, threaded into the sides of head 5 near opposite ends thereof. These screws bear against lugs 32 and 33 of base plate 2 and adjust either or both ends of the head 5 in or out, the head sliding on the flat surfaces of hemispheres 21. The screws 30, 31 are provided with collars 34 which have graduations around their periphery reading against lines on the head 5 and are held in position on their screws by knurled headed set-screws 35. If it is desired, for instance, to move the head in three thousandths of an inch the collars 34 are loosened and turned from zero three divisions upon the graduations and the screws 30, 31 are turned until the zero points on the collars and upon the head coincide. This provides, therefore, for all the adjustments which could be desired in a horizontal plane inasmuch as the whole head can be moved bodily back and forth, or either the right or left ends of this head can be moved independently.

The combined horizontal and vertical adjustments provide a universal adjustment of the head 5 around a longitudinal axis of the work permitting the head to be moved or tipped in any manner to aline its part of the work with that carried by the sliding head 6. Relative longitudinal adjustment of the heads 5 and 6 is, of course, afforded by the sliding head 6. The necessary adjustment of the head 5 is determined by comparing the relative positions of the parts of the article in any suitable manner. When a number of similar articles are being made, any distortion in the welded product may be measured to determine the movement of head 5 necessary to aline the parts. The micrometer adjusting means will then permit the head to be given the precise adjustment required and the rest of the articles will have their parts welded in perfect alinement.

With the heads relatively positioned to bring the parts of the work into perfect alinement the adjustable head 5 is locked against shifting by clamping means which press the head firmly in place against the adjusting means. Three screw studs 36, 37 and 38 extend upwardly from base 1 and carry clamping nuts 39 bearing downwardly on head 5 and forcing it against the supports 15, 16 and 17. At the back of head 5 and at the other side of the longitudinal center line are horizontal screws 40 and 41 opposing the adjusting screws 30 and 31 and engaging the rear surfaces 42 and 43 to lock the head horizontally on the adjusting screws 30 and 31 by equal and opposite pressure. After the adjustment of head 5 has been completed the head is locked in position by the nuts 39 and screws 40 and 41 pressing against the adjusting means to take up all looseness of the parts and secure the alinement of the work.

When the sliding head 6 is moved to force the ends of the work together, great pressure is often developed between the heads 5 and 6. To relieve the adjusting and clamping means of head 5 from this longitudinal strain or thrust the fixed abutment 45 is provided comprising a convex headed pin set in a lug 46 of base plate 1 and engaging the lug 47 depending from head 5. This abutment is placed centrally near the right hand end of the head and in position to coöperate perfectly with the adjusting and clamping means. It permits the vertical, lateral and tipping movements of the head without interference, and is always kept in snug contact with abutment 47 of the head 5 by spring plunger 50 pressing against lug 51 to urge the head to the left taking up all play in the direction of the welding forces. All adjustments are, therefore, made around a fixed point and no matter what the position of the head is, the pressure of spring plunger 50 insures that the thrust on the head shall always be taken by abutments 45 and 47 and avoids yielding of the head under the welding stresses by holding all the parts in tight engagement by pressure in the direction of the welding thrust.

The vertical and horizontal clamping means serve then to lock the head 5 in its precise adjusted position taking up all looseness in the parts and rigidly holding the head against yielding or shifting. The three points support and the three point clamping means combine to hold the head against any vertical shifting or twisting while the horizontal adjusting and clamping means at opposite ends of the head in combination with fixed abutment hold it against all other movement. The structure is very strong and firm as the greatest stresses on the head are opposed by the rigid abutments 45 and 47, only the resultant stresses are to be met by the clamping and adjusting means. The widely separated bearings 16 and 17 and the coöperating clamping screws 36 and 37 are advantageously mounted substantially in a vertical plane with the gripping jaws to directly oppose any twisting of the head around a longitudinal axis and to hold the head against resultant lifting forces. The clamping and adjusting means can therefore be positioned out of the way below the line of the work without sacrifice of strength and rigidity, and they are housed within and protected by the depending flange 53 around the edges of head 5.

The fixed abutment and the adjusting and clamping means combine to produce a rigid, unyielding support which is compact, out of the way and yet easily accessible and is capable of universal adjustment with great precision. The parts of the work are readily brought into perfect alinement and securely maintained there during the welding operation, thus producing a perfect product without the wasteful reshaping and resizing heretofore necessary.

I claim:—

1. An electric butt welding machine comprising a frame, two opposed work supporting heads insulated from one another and supported on said frame, each head being adapted quickly to engage or disengage a respective member of two members to be welded together, one of said heads being quickly movable on the frame to or from the other head, means to send a welding current through said heads and any interposed metallic members carried thereby, and means to adjust one of said heads so as accurately to aline the two members carried thereby comprising an adjustable three point support, and clamping mechanism holding said head on said support.

2. An electric butt welding machine comprising a frame, two opposed work supporting heads insulated from one another and supported on said frame, each head being adapted quickly to engage or disengage a respective member of two members to be welded together, one of said heads being quickly movable on the frame to or from the other head, means to send a welding current through said heads and any interposed metallic members carried thereby, and means to adjust one of said heads laterally and angularly in all directions so as accurately to aline the two members carried thereby comprising an adjustable three point support, and clamping mechanism holding said head on said support.

3. An electric butt welding machine comprising a frame, two opposed work supporting heads insulated from one another and supported on said frame, each head being adapted quickly to engage or disengage a respective member of two members to be welded together, one of said heads being quickly movable on the frame to or from the other head, means to send a welding current through said heads and any interposed metallic members carried thereby, and micrometer adjusting means for moving and tipping one of said heads so as accurately to aline the two members carried thereby comprising an adjustable three point support, and means for moving said head parallel to the adjusted plane of said support.

4. In an electric welding machine, the combination with relatively movable clamping heads adapted to press together the parts to be welded, of means for movably supporting one of said heads comprising a three point support having self-alining hemispherical bearings, and means for sliding said head on the flat surfaces of said bearings parallel to the adjusted plane of said support.

5. An electric butt welding machine comprising a frame, two opposed work supporting heads insulated from one another and supported on said frame, each head being adapted quickly to engage or disengage a respective member of two members to be welded together, one of said heads being quickly movable on the frame to or from the other head, means to send a welding current through said heads and any interposed metallic members carried thereby, means to adjust one of said heads so as accurately to aline the two members carried thereby, coacting thrust abutments on the frame and the adjustable head, and means to keep said abutments constantly in engagement while adjustments are being made.

6. In an electric welding machine, the combination with a base member of relatively movable pressing heads adapted to press together the parts to be welded, coacting abutments on said base and one of said heads adapted to receive the welding thrust, means for adjusting said head relatively to the base to accurately position said head in advance of the application of the welding pressure, and means for clamping said head in its adjusted position.

7. In an electric welding machine, the combination with a base member of relatively movable pressing heads adapted to press together the parts to be welded, coacting abutments on said base and one of said heads adapted to receive the welding thrust, means for adjusting said head relatively to the base to accurately position said head, and means for clamping said head in its adjusted position by pressure exerted at an angle to said welding thrust.

8. In an electric welding machine, the combination with a longitudinally movable clamping head, of a stationary adjustable head and supporting means for said stationary head comprising a longitudinally fixed abutment, means for universally adjusting said stationary head around said abutment, and means for clamping said head in adjusted position.

9. In an electric welding machine, the combination with a work clamping head, of a fixed abutment holding said head against the welding thrust, and resilient means pressing said head against said abutment in the direction of the welding thrust.

10. In an electric welding machine, the combination with a work clamping head having depending side flanges surrounding its edges, of a supporting base plate, and vertical and laterally adjusting means on said base plate comprising an adjustable three point support and lateral clamping means housed within said head and accessible for manipulation outside of said head.

11. In an electric welding machine, the combination with relatively movable clamping heads adapted to press together the parts to be welded, of means for movably supporting one of said heads comprising an adjustable three point support, and clamping mechanism holding said head on said support.

12. In an electric welding machine, the combination with relatively movable clamping heads adapted to press together the parts to be welded, of means for movably supporting one of said heads comprising three self-alining bearings, one or more of which are movable to form an adjustable three point support, and clamping mechanism holding said head on said support.

13. In an electric welding machine, the combination with relatively movable clamping heads adapted to press together the parts to be welded, of means for movably supporting one of said heads comprising an adjustable three point support, and means for adjusting said head parallel to the plane of said support.

14. In an electric welding machine, the combination with a base member, of relatively movable clamping heads adapted to press together the parts to be welded, coacting abutments on said base and one of said heads receiving the welding thrust, and means for adjusting said head relatively to said base abutment comprising an adjustable three point support, and clamping mechanism holding said head on said support.

15. In an electric welding machine, the combination with a base member, of relatively movable clamping heads adapted to press together the parts to be welded, coacting abutments on said base and one of said heads receiving the welding thrust, and means for adjusting said head relatively to said base abutment comprising an adjustable three point support, and means for adjusting said head parallel to the plane of said support.

16. In an electric welding machine, the combination with a base member, of a clamping head for supporting one of the parts to be welded comprising clamping means at one end for gripping the part to be welded and a substantially triangular shaped supporting portion having depending flanges around its edges, an adjustable three point support and lateral clamping means housed between said supporting portion and said table member and housed within said depending flanges, and means rendering said support and clamping means accessible to the operator.

GUSTAVE H. SCHKOMMODAU.